United States Patent
Aboba et al.

(10) Patent No.: US 8,301,081 B2
(45) Date of Patent: Oct. 30, 2012

(54) PHYSICAL AND MAC ADAPTATION FOR INTERFERENCE MITIGATION WITH COGNITIVE RADIO

(75) Inventors: Bernard D. Aboba, Bellevue, WA (US); Paramvir Bahl, Sammamish, WA (US); Gopala S. Narlanka, Bellevue, WA (US); Jitendra D. Padhye, Redmond, WA (US); Bozidar Radunovic, Cambridge (GB); Ramachandran Ramjee, Bangalore (IN); Kun Tan, Beijing (CN); Miguel Oom Temudo de Castro, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 11/939,217

(22) Filed: Nov. 13, 2007

(65) Prior Publication Data

US 2009/0124205 A1    May 14, 2009

(51) Int. Cl.
*H04B 7/00* (2006.01)
*H04B 5/00* (2006.01)

(52) U.S. Cl. ............... 455/41.2; 455/41.1; 455/41.3; 455/63.1; 455/114.2; 455/278.1; 455/296

(58) Field of Classification Search ......... 455/41.1–3, 455/63.1, 114.2, 278.1, 296
See application file for complete search history.

(56) References Cited

U.S. PATENT DOCUMENTS

| | | | |
|---|---|---|---|
| 6,317,495 B1 | 11/2001 | Gaikwad et al. | |
| 6,760,671 B1 | 7/2004 | Batcher et al. | |
| 7,035,593 B2* | 4/2006 | Miller et al. | 455/67.11 |
| 7,076,246 B2 | 7/2006 | Chitrapu | |
| 7,079,847 B2* | 7/2006 | Blair et al. | 455/452.2 |
| 7,092,363 B1 | 8/2006 | Majidi-Ahy | |
| 2002/0044614 A1* | 4/2002 | Molnar et al. | 375/346 |
| 2004/0203398 A1* | 10/2004 | Durrant | 455/63.1 |
| 2005/0192048 A1* | 9/2005 | Bridgelall | 455/553.1 |
| 2006/0009209 A1 | 1/2006 | Rieser et al. | |
| 2006/0045117 A1 | 3/2006 | Qi et al. | |
| 2006/0121853 A1 | 6/2006 | Madhavan et al. | |
| 2007/0042733 A1 | 2/2007 | Tomioka | |
| 2007/0082632 A1 | 4/2007 | Liu | |
| 2007/0091998 A1 | 4/2007 | Woo et al. | |
| 2007/0100922 A1 | 5/2007 | Ashish | |
| 2007/0104140 A1 | 5/2007 | Ashish et al. | |
| 2007/0105501 A1 | 5/2007 | Shen et al. | |
| 2008/0311851 A1* | 12/2008 | Hansen et al. | 455/41.2 |

OTHER PUBLICATIONS

Hyoil Kim et al., "Adaptive MAC-layer Sensing of Spectrum Availability in Cognitive Radio Networks," New Frontiers in Dynamic Spectrum Access Networks, 3rd IEEE Symposium, published on Oct. 14-17, 2008, 21 pages. Paul Kolodzy, "Application of Cognitive Radio Technology across the Wireless Stack," accessible from http://ietcom.oxfordjournals.org/cgi/content/abstract1E88-B/11/4158, obtained on Aug. 6, 2007, 2 pages.

(Continued)

*Primary Examiner* — Wen Huang
(74) *Attorney, Agent, or Firm* — Lee & Hayes, PLLC (57) ABSTRACT

A communication device cognitively monitors interference signals across a communication band so that adaptations for physical and medium access control (MAC) of data packet transmissions are appropriate for a particular interference signal. Characteristics of an interference signal of interest (e.g., bandwidth, power and/or duration relative to an average data packet transmitted over a communication channel of the communication device) are sensed for an appropriate adaptation (e.g., forward error correction, modulation technique, back off, request to send/clear to send protocol, etc.). Patterns for known types of interference sources can be compared so that when recognized an associated adaptation can be used.

22 Claims, 9 Drawing Sheets

OTHER PUBLICATIONS

PCT Search Report and Written Opinion for PCT/US2008/078384, mailed Mar. 5, 2009, 11 pages.

Shridhar Mubaraq Mishra, "A Real Time Cognitive Radio Testbed for Physical and Link Layer Experiments," IEEE DySPAN Conference, Nov. 25, 2005, 6 pages.

Srikathyayani Srikanteswara et al., "Interference Mitigation Using Spectrum Sensing," in Proceedings of 16th International Conference on Computer Communications and Networks, Aug. 13-16, 2007, pp. 39-44.

* cited by examiner

FIG. 6   4. DTV Signal Detection

FIG. 7   5. NTSC Signal Detection

PHYSICAL AND MAC ADAPTATION FOR INTERFERENCE MITIGATION WITH COGNITIVE RADIO

BACKGROUND

A wireless local access network (WLAN) is a data transmission system to provide location independent network access between computing devices by using radio waves rather than a cable infrastructure. Often, WLANs are implemented as the final link between existing wired network and a group of client computers, giving these users wireless access to the full resources and services of the corporate network across a building or campus setting.

The 802.11 specification as a standard for WLANs was ratified by the Institute of Electrical and Electronic Engineers (IEEE) in 1997. Like all of the IEEE 802 standards, 802.11 standards focus on the bottom two level of the International Organization for Standardization (ISO) model, the physical layer and the data link layer. The data link layer provides and functional and procedural means to transfer data between network entities and to detect and possibly correct errors that may occur in the physical layer. In the current context, this data link layer is further subdivided into Media Access Control (MAC) sublayer that manages interaction of devices with a shared medium. Above the MAC sublayer is the media-independent 1IEEE 802.2 Logical Link Control (LLC) sublayer that deals with addressing and multiplexing on multi-access media.

The physical layer defines all of the electrical and physical specifications for devices, and in particular the relationship between a device and a physical medium. The major functions and services of the physical layer are establishment and termination of a connection to a communications medium (e.g., wireless); contention resolution and flow control; and modulation, or conversion between representation of digital data into corresponding transmitted signals over a communication channel (e.g., radio link).

The 802.11 standards were implemented to provide reliable and secure wireless connectivity at high data rates. 802.11b and 802.11g standards use the 2.4 GHz band, operating in the United States under Part 15 of the FCC Rules and Regulations in the unlicensed Industrial, Scientific and Medical (ISM) bands. With the abundance of WLAN devices (e.g., access points, personal digital assistants (PDSs), laptop computers) in geographic proximity, interference is an increasing problem.

In addition, because of this choice of frequency band, 802.11b and 802.11g equipment could occasionally suffer interference from microwave ovens, sulfur lamps, wireless microphones, television broadcasts, or cordless telephones. Wireless personal area networks (PANs), such as Bluetooth devices, while operating in the same 2.4 GHz band, do not interfere with 802.11b and 802.11g in theory because they use a frequency hopping spread spectrum signaling method (FHSS) while 802.11b/g uses a direct sequence spread spectrum signaling method (DSSS). However, it should be appreciated that FHSS means that such devices should only occasionally collide on the same frequencies rather than not interfering at all.

Physical and MAC layer adaptation is critical for performance wireless networks to mitigate the effect of interference. Previously, it has been difficult for the radio to detect what the exactly source of channel degradation and therefore may not take the right adaptation actions. For example, most of current IEEE 802.11 radio decreases rate when it finds a packet loss. However, this adaptation may be wrong if the packet loss is cause by an instantaneously interference from a transmission of nearby node (i.e., collision).

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In one aspect, a wireless device has a transmitter for digital wireless transmission on one of a plurality of communication channels of a communication band. A cognitive radio sensor monitors radio frequencies across the communication band. An interference module characterizes an interference signal sensed by the cognitive radio sensor. A communication module for physical layer and medium access control (MAC) layer control of the transmitter having an adaptation selected based on the characterization of the interference signal.

In another aspect, a method for mitigating interference includes transmitting on a wireless digital packet communication channel of a plurality of channels of a communication band. Monitoring power and duration of radio frequencies across the communication band identifies an interference signal of interest that is then characterized. An adaptation can then be selected for physical layer and medium access control (MAC) layer control that is appropriate for interference signal.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

A communication device cognitively monitors interference signals across a communication band so that adaptations for physical and medium access control (MAC) of data packet transmissions are appropriate for a particular interference signal. Characteristics of an interference signal of interest (e.g., bandwidth, power and/or duration relative to an average data packet transmitted over a communication channel of the communication device) are sensed for an appropriate adaptation (e.g., forward error correction, modulation technique, back off, request to send/clear to send protocol, etc.). Patterns for known types of interference sources can be compared so that when recognized an associated adaptation can be used.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
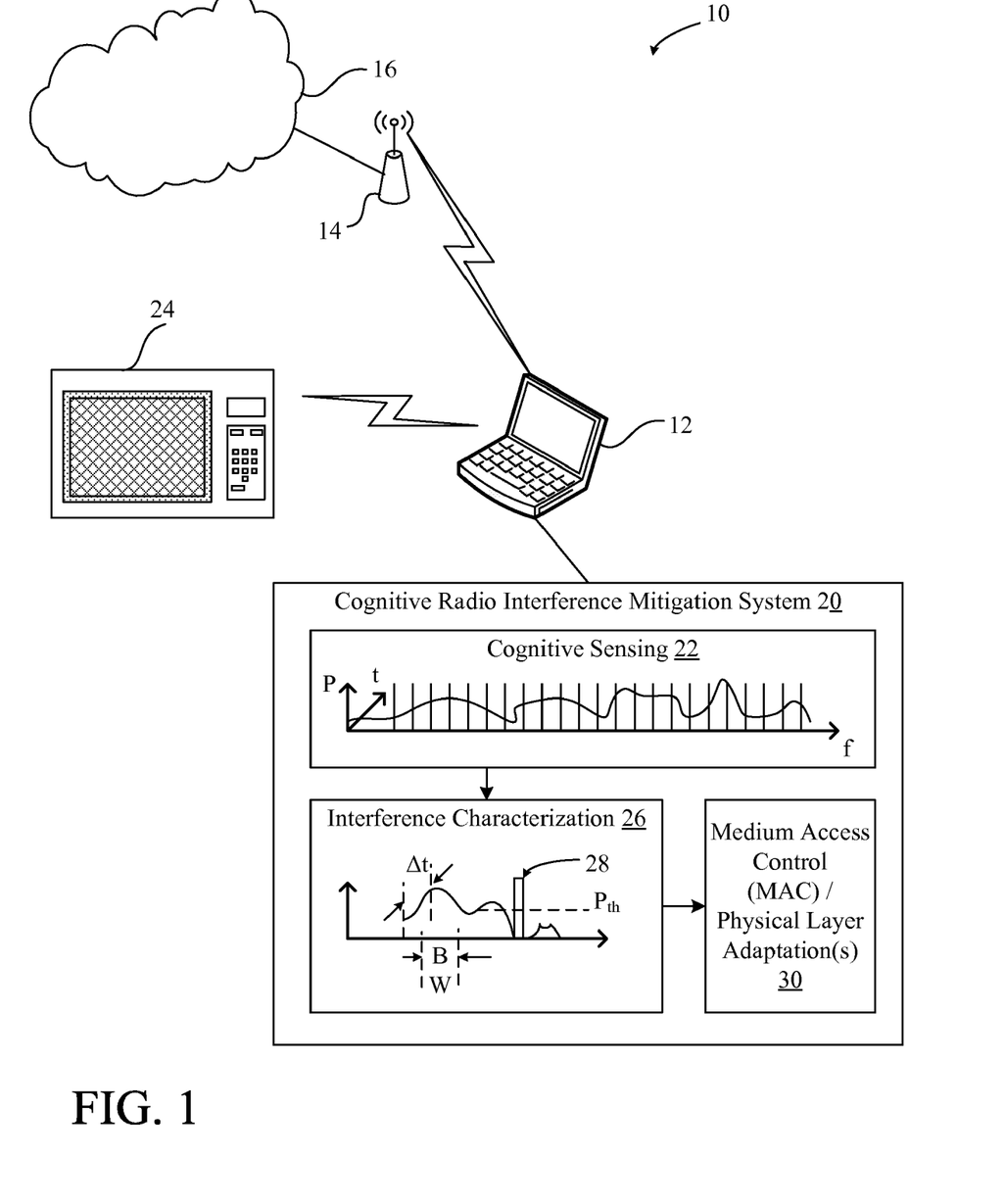
FIG. 1 depicts a wireless data packet communication system that provides a communication device sensing and characterizing of an interference source so that mitigation adaptation is selected to communicate with an access point of a communication network.

Referring initially to FIG. 1, illustrated is a communication system 10 for wireless data packet communication between a communication device 12 and an access point 14 of a communication network 16. The communication device 12 overcomes an interference signal, depicted at 18, by use of a cognitive radio interference mitigation system 20. A cognitively sensing module 22 scans a range of frequencies of a communication band, monitoring power and duration of frequency spectra until an interference signal of interest indicates the presence of an interference source 24. Then an interference characterization module 26 categorizes the interference signal 18 for one or more characteristics relative to an average data packet transmitted by the communication device. For instance, recognizable and distinguishing waveform characteristic 28 may be sensed (e.g., pilot signal of a television broadcast waveform, carrier wave frequency and modulation, etc.). Such recognition can include a determination of whether this signal is a hidden wireless terminal, an access point, a Bluetooth device, a wireless microphone, a television broadcast, etc., or an environmental interference emitter (e.g., microwave oven as depicted)). As another example, a duration "$\Delta t$" relative to the average data packet (e.g., ten times longer) can categorize the interference signal 18 as short term or long term. As yet an additional example, a bandwidth "BW" can indicate whether the interference signal is relatively narrowband (e.g., less than ten percent of the communication channel being used) or wideband. As yet a further example, a power level relative to communication device 12 is sensed. With one or more of these characteristics ascertained, an adaptation module 30 for physical layer and/or medium access control (MAC) layer control selects an adaptation appropriate for the category of the interference signal 18. Examples of adaptation include increasing forward error correction, hanging modulation, increasing transmit power, changing communication channel, increasing back off delay, enabling request to send/clear to send (RTS/CTS) protocol, etc.

Figure 2:
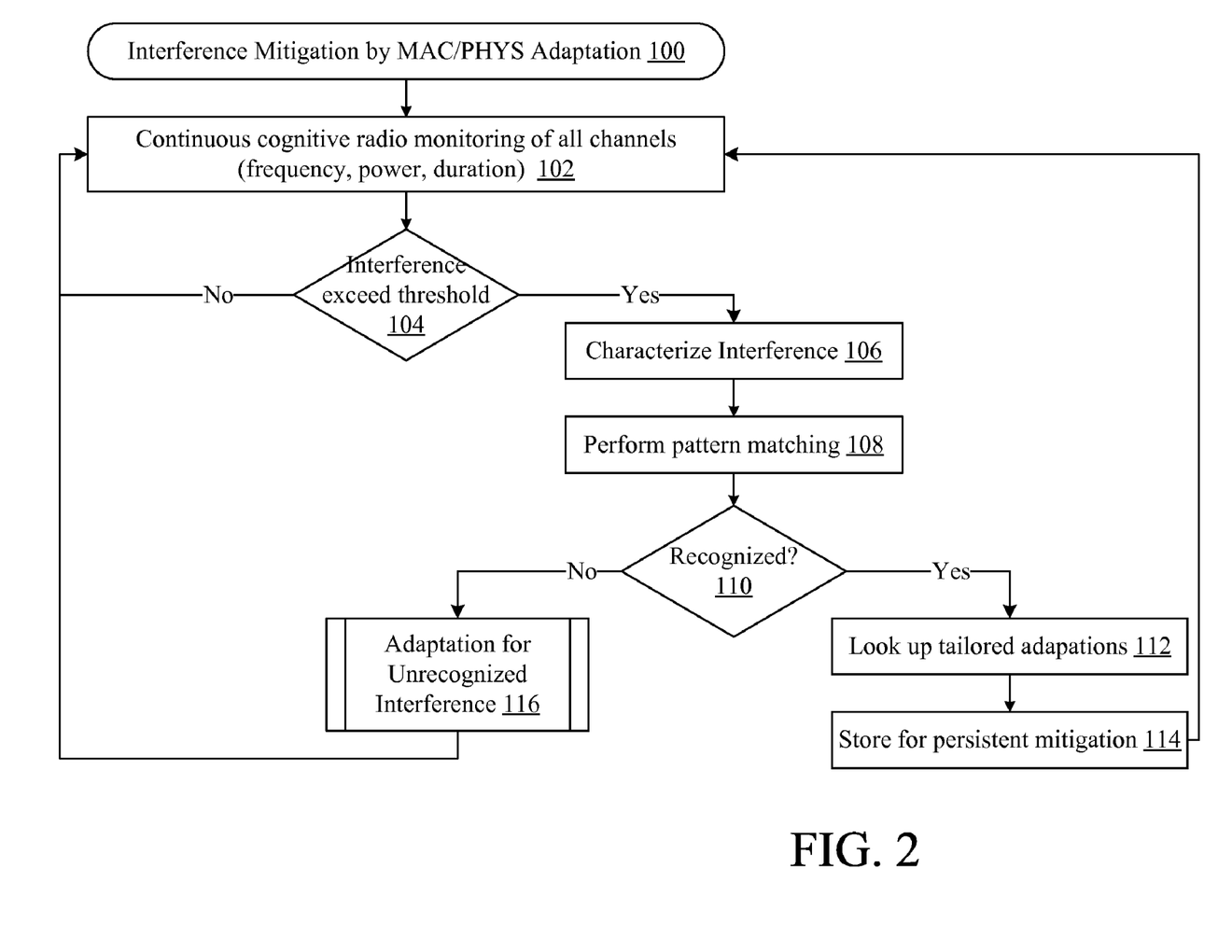
FIG. 2 depicts a methodology performed by the communication device of FIG. 1 for mitigation of interference.

With reference to FIG. 2, a methodology 100 performed by the communication device 12 for interference mitigation by physical/MAC layer adaptation begins by scanning sensed power of narrow frequency spectra that comprise a communication band in block 102. In addition to instantaneous power sensing, a history for each frequency spectra or low-pass filtering of such data yields duration information for interference at particular frequencies. Such monitoring continues until a particular interference signal of interest occurs, such as when a particular signal exceeds a threshold as depicted in block 104. An interference signal of interest may also be determined in response to a system error condition such as an unacceptable increase in error rate.

In response, the interference signal of interest is characterized in block 106. If suitable patterns are accessible, the interference signal is compared to these patterns in block 108. If recognized in block 110, additional characteristics may be read that associated with this type of interference, such as the tendency for persistence and for a particular tailored adaptation that is particularly suitable to overcome this interference in block 112. The presence of this particular interference source is stored in block 114 to maintain the adaptation for a predetermined period of time or for as long as the interference signal is sensed. Depending upon the mobility associated with the communication device 12 and/or the interference source, it may be beneficial to store the recognition of the pattern if predicted to interfere in the future. If the pattern was not recognized in block 110, then a general adaptation scheme may be invoked in block 116.

Figure 3:
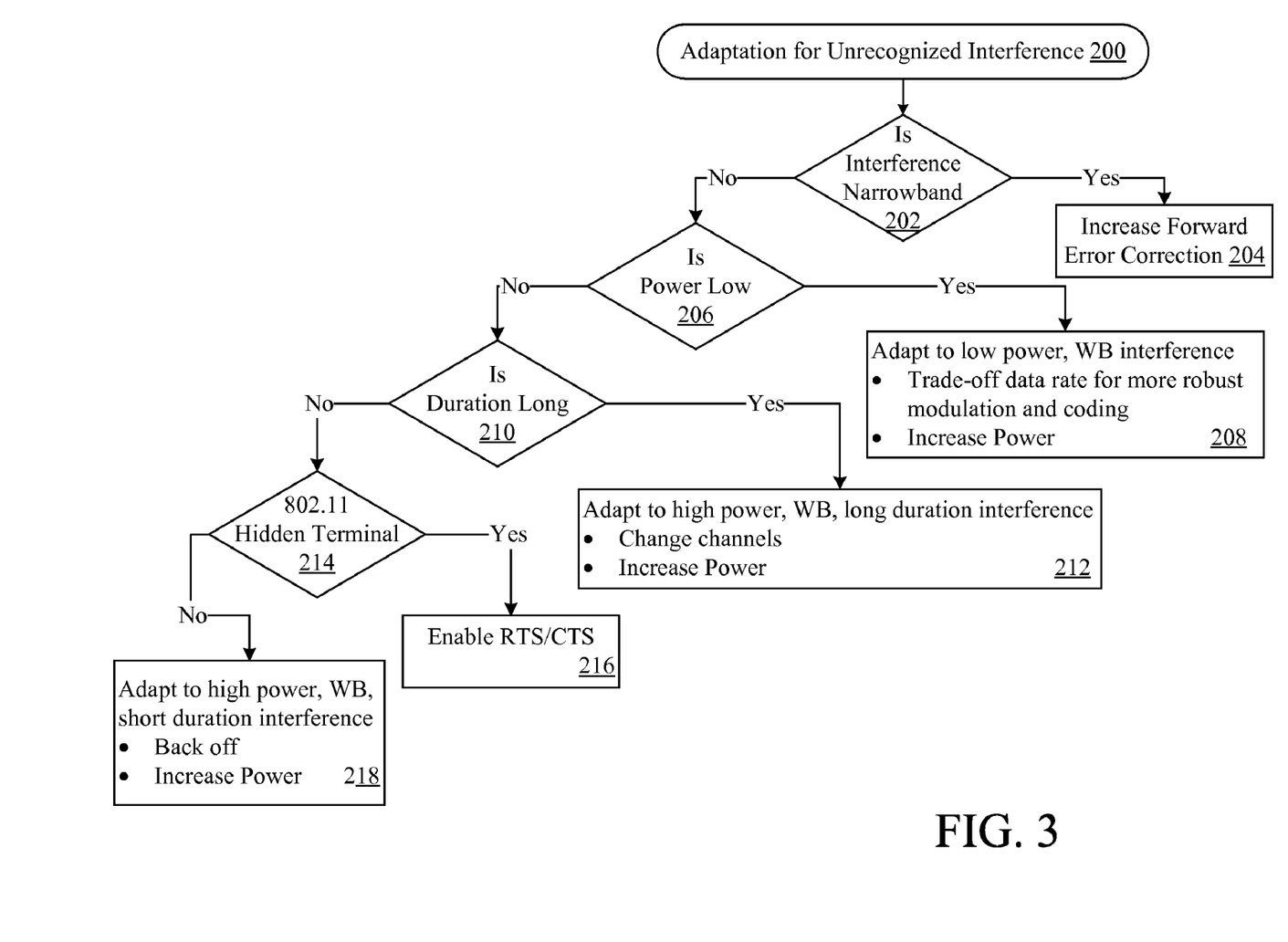
FIG. 3 depicts a methodology for general characterization of an unrecognized interference source of the methodology of FIG. 2.

Turning to FIG. 3, a methodology 200 depicts one such general adaptation scheme for interference mitigation. In block 202, a determination is made as to whether the interference signal is categorized as narrowband (e.g., less than ten percent of the communication channel being used by the communication device). If so, data rate may be traded away for more forward error correction (FEC) in block 204 sufficient to counter the increased likelihood of a data transmission error.

If not narrowband in block 202, then a wideband interference signal is further categorized for power level. If a determination is made that the power level is low relative to a physical layer power setting of the communication device (e.g., half) in block 206, then an adaptation may be selected in block 208 such as switching to a more robust modulation scheme or coding scheme to be accurately received, or transmit power increased if physically possible or legally allowed.

If in block 206 the determination is that interference signal is wide band and high power, then a further determination is made in block 210 as to whether the interference signal of the interference source is short term or long term relative to targeted source that transmits data packets. In general, an interference source is deemed short term if its transmit interval is comparable to the data source. The interference source is deemed long term if its transmit interval is much larger than that of the data source. Assume the average data packet size of the targeted source (e.g., communication device) is "s" and the current data rate is "r". Then, the transmission time of the data source can be estimated by $$t_{As} = t_s + \frac{s}{o},$$

where $t_o$ is the constant per packet overhead. An interference source is considered as short term, if its transmission time $t_{is}$ satisfies $t_{is} < \theta \cdot t_{ds}$, where $\theta$ is a tunable parameter and usually is less than 10. An interference source is considered as long-term, if $t_{is} \geq \theta \cdot t_{ds}$. If deemed long term in block 210, then an adaptation such as changing channels and/or increasing power can be employed in block 212.

If deemed short term in block 210, then a further determination in block 214 is made as to whether the wideband, high power, short duration interference signal has further characteristics of an IEEE 802.11 hidden terminal, and if so RTS/CTS is enabled in block 216. If not a hidden terminal in block 214, then an adaptation may be selected such as performing a time delay (back off) and/or to increase transmit power.

Figure 4:
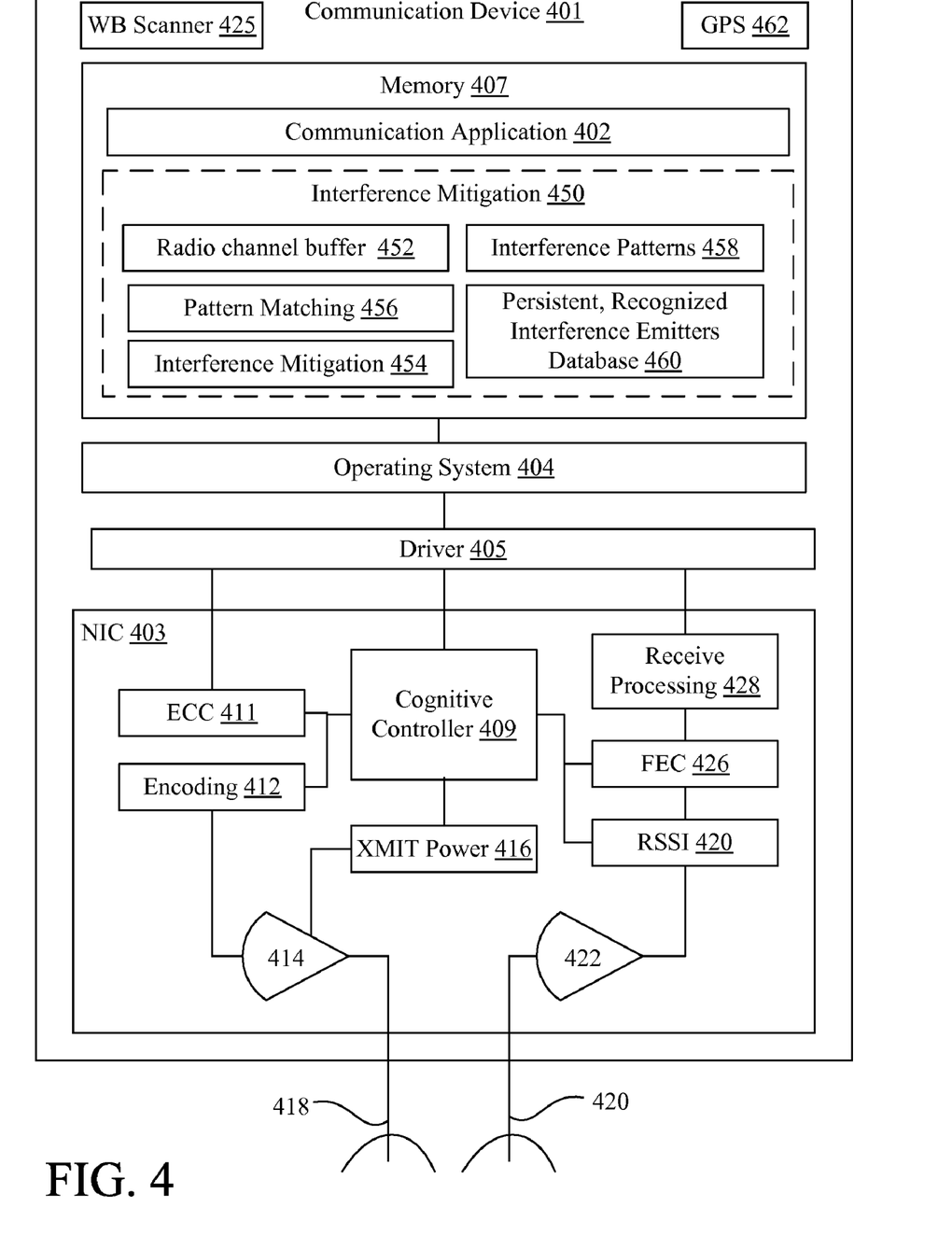
FIG. 4 depicts an illustrative computing platform for the communication device of FIG. 1.

The communication device 12 of FIG. 1, as well as any other computing devices capable of measuring wireless communication and taking corrective action according to aspects of the invention may include components as illustrated in FIG. 4. Thus, a device 401 (e.g., a communication device 12) may include a network interface card (NIC) 403 which allows the device 401 to communicate over a network such as, for example, a wireless network. A driver 405 enables interaction between NIC 403 and other components of the device 401, such as, for example, operating system 405 and applications 402. Driver 405 may be computer-executable instructions encoded in a suitable computer-readable medium, which may include memory components on NIC 403 or may include memory storing operating system instructions for device 401 or other suitable memory depicted at 407.

NIC 403 may provide functionality of a receiver and transmitter configured to receive and transmit wireless communications. Components included in the receiver and transmitter are controlled by a controller 409. Controller 409 may receive commands from driver 405. In some versions, commands for controller 409 may be generated within components of operating system 404 or applications 402 and passed through driver 405 to controller 409. Similarly, status information concerning the operation of NIC 403 may be collected within controller 409 and passed to driver 405 or passed through driver 405 to operating system 404 or applications 402. Accordingly, control functions for any of the components within NIC 403 may be implemented within controller 409 or may be implemented within driver 405, within components of operating system 404, or within applications 402. Accordingly, the aspects of the invention relating to control of components of NIC 403 may be implemented by configuration of controller 409, programming within driver 405 or software components within operating system 404 or applications 402. However, the specific mechanism by which control functions are implemented is not critical to the invention and any suitable implementation may be employed.

To send packets from the device 401, the packets may be encoded using an Error Control Coding (ECC) component 411 providing error control coding of any suitable type. For example, the encoding may use a multi-bit error correcting code. In the embodiment illustrated, ECC component 411 may add a number of error control bits to each packet to be transmitted. The number of error control bits added to a packet may be configurable in response to commands from controller 409. Altering the number of bits per packet used for error control coding is a possible adaptation that may be made in NIC 403 for poor channel conditions. For example, more error control bits may be added in a noisy channel in which frequent errors occur. However, increasing the number of bits used for error correction reduces the percentage of bits used for data transmission. Further features are described in co-pending and commonly owned U.S. patent application Ser. No. 11/801,803 entitled "INTERFERENCE DETECTION" and Ser. No. 11/801,785 entitled "CHANNEL CONTROL BASED ON ERROR CORRECTION VALUES", the disclosures of both of which are hereby incorporated by reference in their entirety.

An encoding component 412 may implement any suitable encoding according to a data transmission protocol used for wireless communication. Encoding implemented within encoding component 412 may use a modulation scheme that is configurable based on input from controller 409. The modulation scheme used in encoding component 412 may also be used to adapt to channel conditions. For example, encoding component 412 may support a range of encoding schemes with a variable number of bits per symbol. To adapt to noisy channels, encoding component 412 may be controlled to use an encoding scheme with a low number of bits per symbol. Conversely, in a high-quality channel, encoding component 412 may be controlled to use an encoding scheme with a large number of bits per symbol, thereby increasing the data transmission rate.

The encoded data are then transmitted by a transmitter 414 at a transmit power level controlled by a transmit "Xmit" power controller 416. Transmission may be made via one or more transmit antennae 418. The transmit power level may also be controlled by controller 409 and may serve as a further mechanism to adapt to channel conditions. For example, in a noisy channel, a higher transmit power may be specified.

Corresponding processing may be performed on received packets. Packets received by the device 401 at one or more receive antennae 420 may be processed through a receiver 422 and then supplied to a received signal strength indicator (RSSI) component 420. RSSI may be obtained from a field in a received packet or it may be directly measured from the received wireless signal and then output in any suitable format. RSSI component 420 may output a signal strength or a signal to noise ratio (SNR) for any desired packets. In the version illustrated, RSSI component 420 outputs a signal strength indication based on the received signal strength. However, the signal strength indication may be obtained in any suitable way. For example, it can be a field in a packet (e.g., an ACK packet) that contains an SNR value from a corresponding packet measured at the receiver side (e.g., a DATA packet). Advantageously, a wider range of frequency spectra are scanned by a wideband scanner 425, which could utilize the receive circuitry simultaneously or intermittently with use by the communication application 402.

In the version illustrated, digital data are transmitted, accordingly, NIC 403 may include one or more components that decodes a received signal to produce a set of digital values for processing. The received bits may be modified in a forward-error correction (FEC) component 418 implementing forward-error decoding. In the version illustrated, FEC component 426 performs an operation that is the inverse of that performed by ECC component 411. FEC component 426 analyzes the received bits, including the error correction bits, and determines the number of bits in error in each received packet. Using an error correction algorithm, FEC component 420 determines the correct values for each bit that is incorrect and removes the error correction bits. In the version illustrated, FEC component 426 is coupled to controller 409. Accordingly, controller 409 has access to information concerning the number of errors detected in each received packet. It should also be appreciated that other types of error correction coding and decoding may be utilized by the device 401.

The FEC component 426 is coupled to a received data processing component 428 which further processes the received packets. Received processing component 428 may perform any number of received processing operations. For example, received processing component 428 may include a buffer in which a received packet is stored until it is transferred for further processing within operating system 404.

In the version illustrated, network interface card 403 may be implemented using technology as is known for constructing wireless network interface cards. Accordingly, transmitter 414 and receiver 422 may be a transmitter and receiver, respectively, as is known in the art. Similarly, antennas 418 and 420 may be implemented using known antennae technology. Likewise, the error correcting coding implemented by ECC component 411 and FEC component 426 may be performed according to a known error correction algorithm. Likewise, the encoding performed in encoding component 412 may be performed in accordance with an 802.11 standard or in any other suitable way. The transmit power may be controlled by transmit power component 416 also using conventional components. Also, the received signal strength may be measured in RSSI component 420 in a conventional way, and receive processing component 428 may be implemented using conventional components. Controller 409 may also be implemented using conventional technology. For example, all of the components within NIC 403 may be implemented in a single integrated circuit chip or in multiple integrated circuit chips using technology currently known for constructing network interface cards.

An interference mitigation component 450 advantageously receives the results of the wideband scanner 425 in a radio channel buffer 452 for analysis. To that end, an interference mitigation application 454 detects an interference signal of interest in the buffer 452 and characterizes the signal. A pattern matching application 456 references stored interference patterns data structure 458 for comparison purposes. Recognized interference sources are then stored in a persistent, recognized interference emitters database 460 for future reference. Location information may be tagged to this entry, such as provided by a Global Positioning System (GPS) module 462. It should be further appreciated that prediction or confirmation of a particular interference emitter may be with reference to absolute location information for the communication device 401, calculated by bearing and estimated range from the local position, etc.

Figure 5:
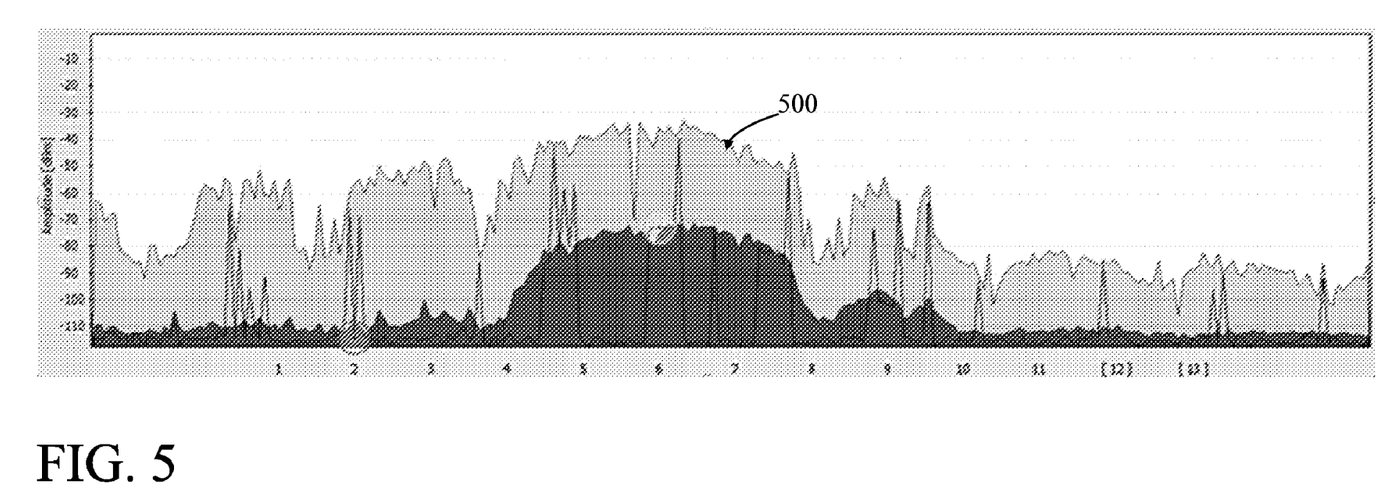
FIG. 5 is a depiction of a power and duration versus frequency scan of communication band of a wireless access point.
Figure 6:
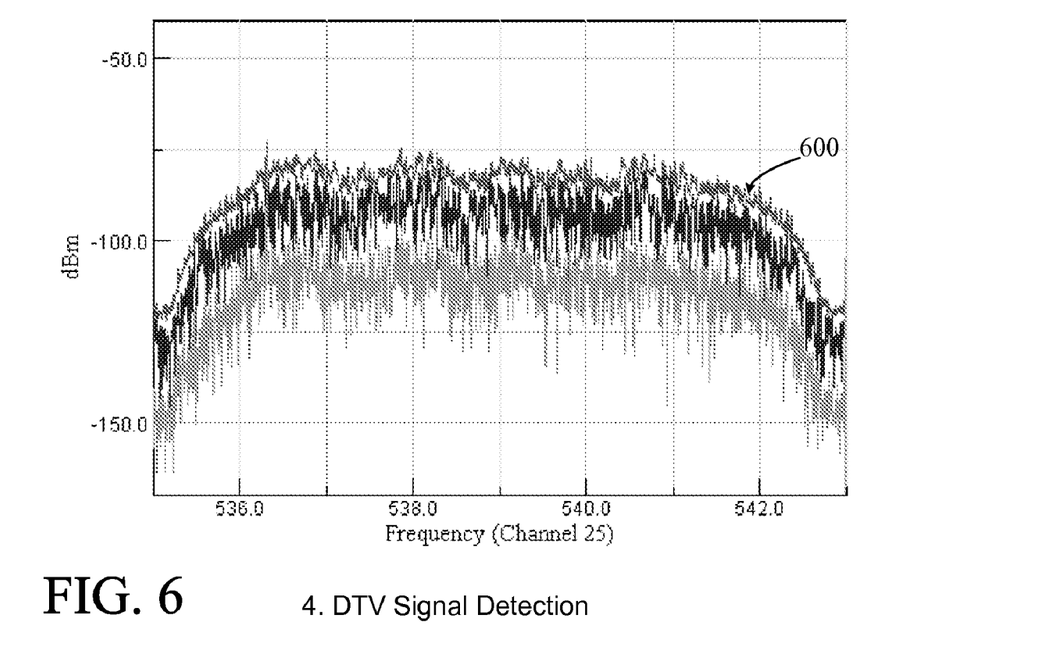
FIG. 6 is a depiction of a scan of a communication channel broadcasting a DTV signal.
Figure 7:
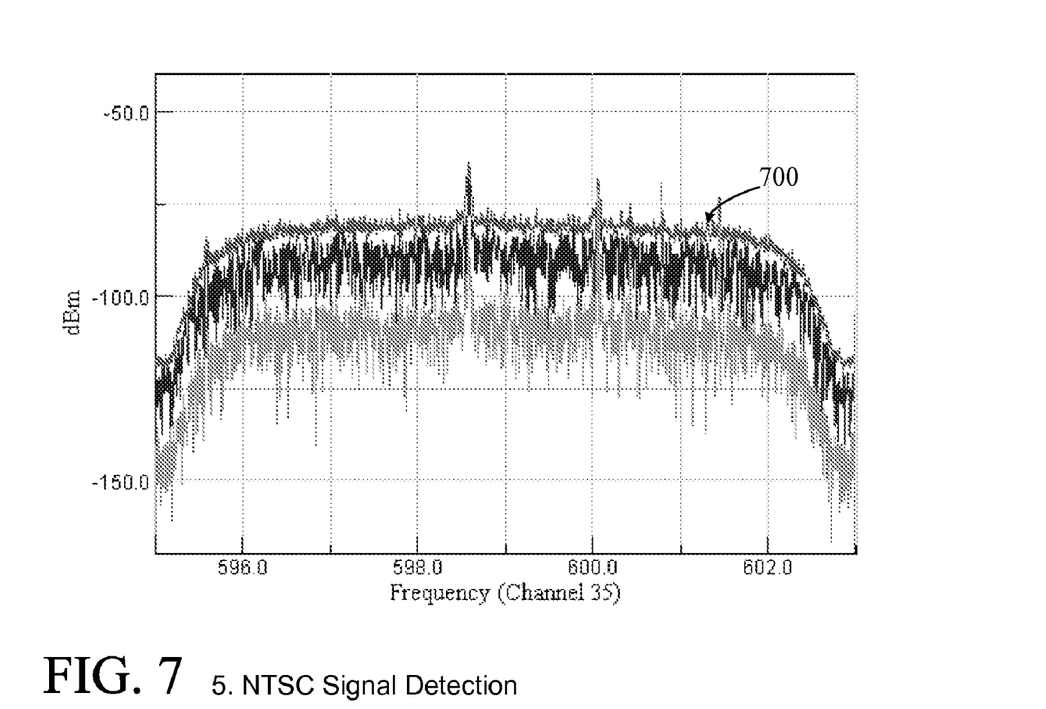
FIG. 7 is a depiction of a scan of a communication channel broadcasting an NTSC signal.
Figure 8:
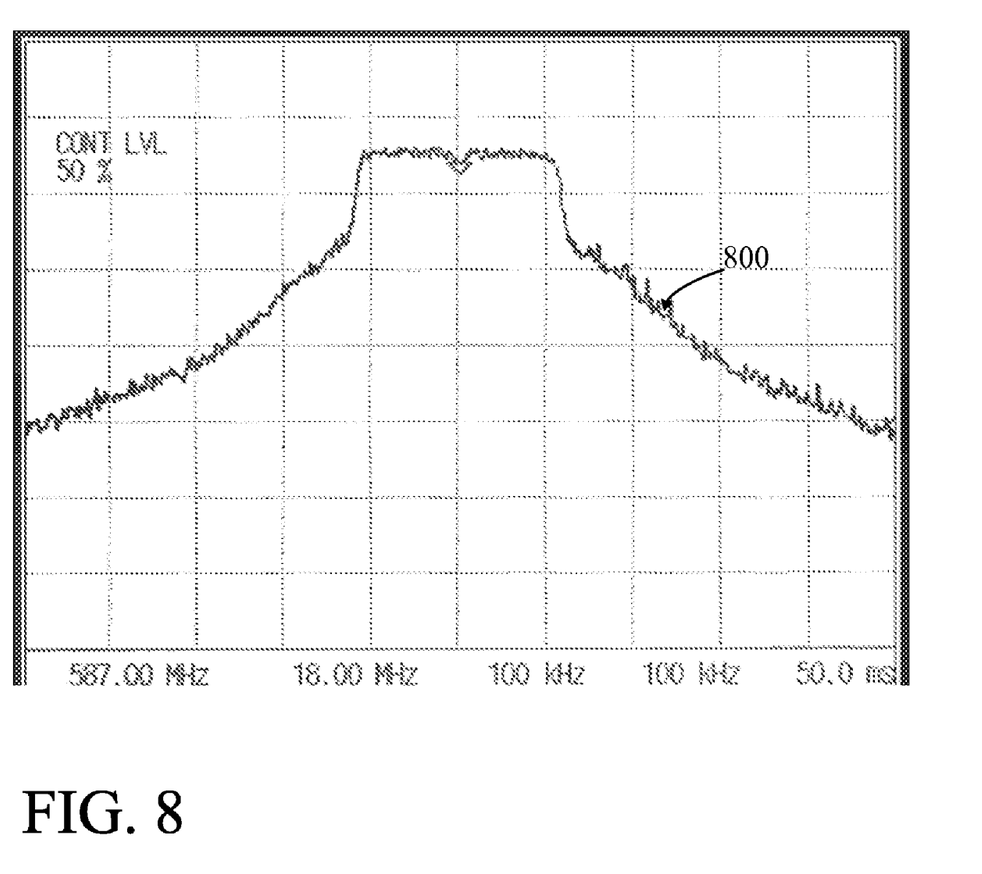
FIG. 8 is a depiction of a scan of a data packet signal broadcast in a TV band.

In FIG. 5, a typical 802.11 access point waveform 500 illustrates the type of interference signal that may be detected. It should be appreciated with the benefit of the present disclosure that aspects have application to improved communication in the ISM band and additionally in other communication bands such as the television band. Recently, it has been appreciated that a large portion of the spectrum licensed to TV bands is unutilized. For example, the average utilization of TV broadcast bands in the US was as low as 14% in 2004. This is in sharp contrast to the overcrowding of wireless communications in the unlicensed ISM bands. To alleviate this disparity, the Federal Communications Commission (FCC) is exploring the possibility of allowing unlicensed wireless communication in white spaces, i.e. portions of the TV bands that are not actively being used by the TV operators. Compared to the higher frequency ISM bands, the lower frequency TV bands have certain radio frequency (RF) propagation properties, such as, longer range, better penetration, and lower interference, that make them extremely desirable for data communication. Being cognitively aware of available spaces thus provides opportunities for high-speed data communication systems that can operate in the white spaces, without interfering with existing TV signals. By recognizing the pattern of a television signal, such as a DTV signal 600 in FIG. 6, a NTSC television signal 700 in FIG. 7, then a data packet signal 800 may be broadcast in the television band as in FIG. 8.

Figure 9:
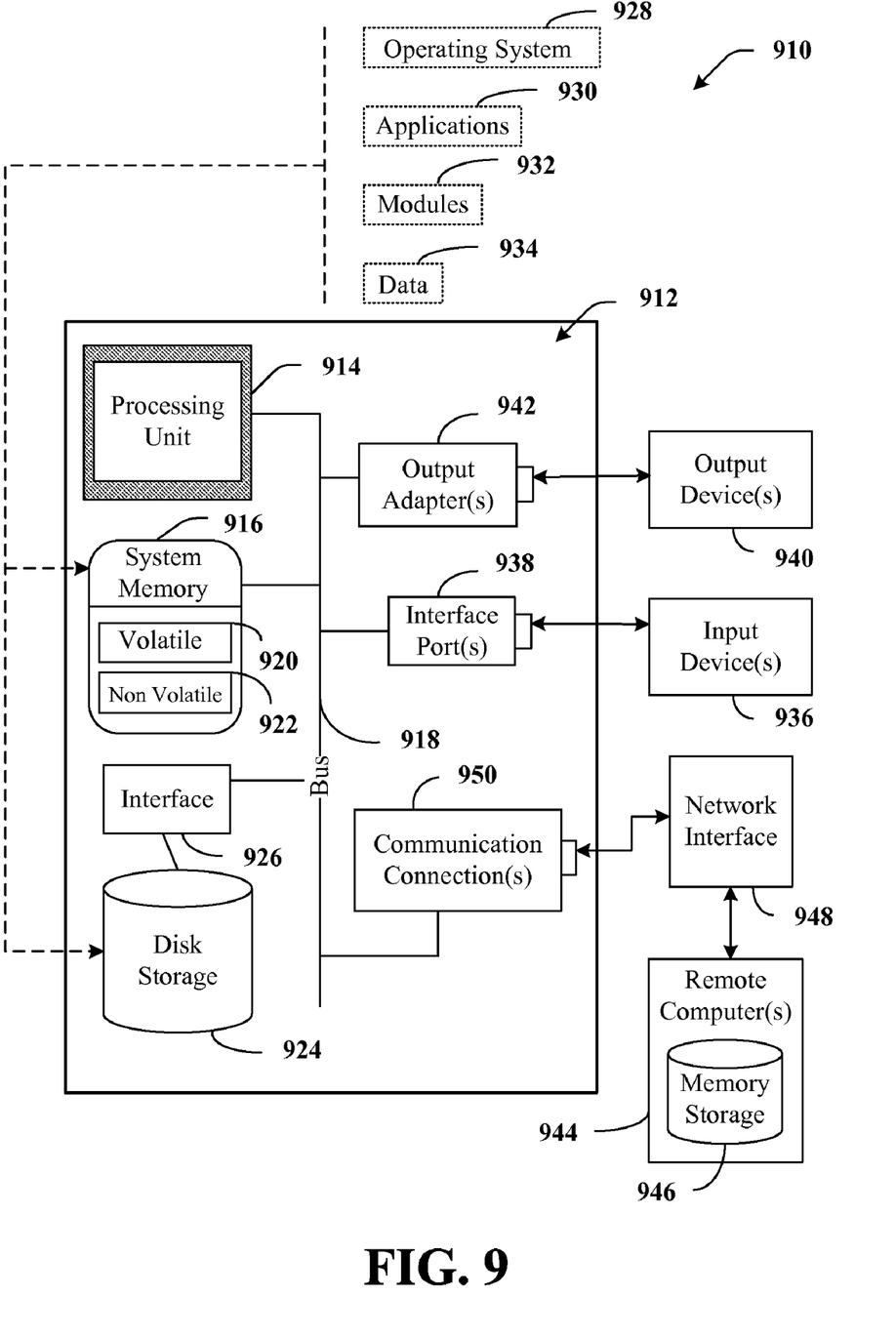
FIG. 9 depicts a schematic block diagram illustrating a suitable operating environment in accordance with an aspect of the subject invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
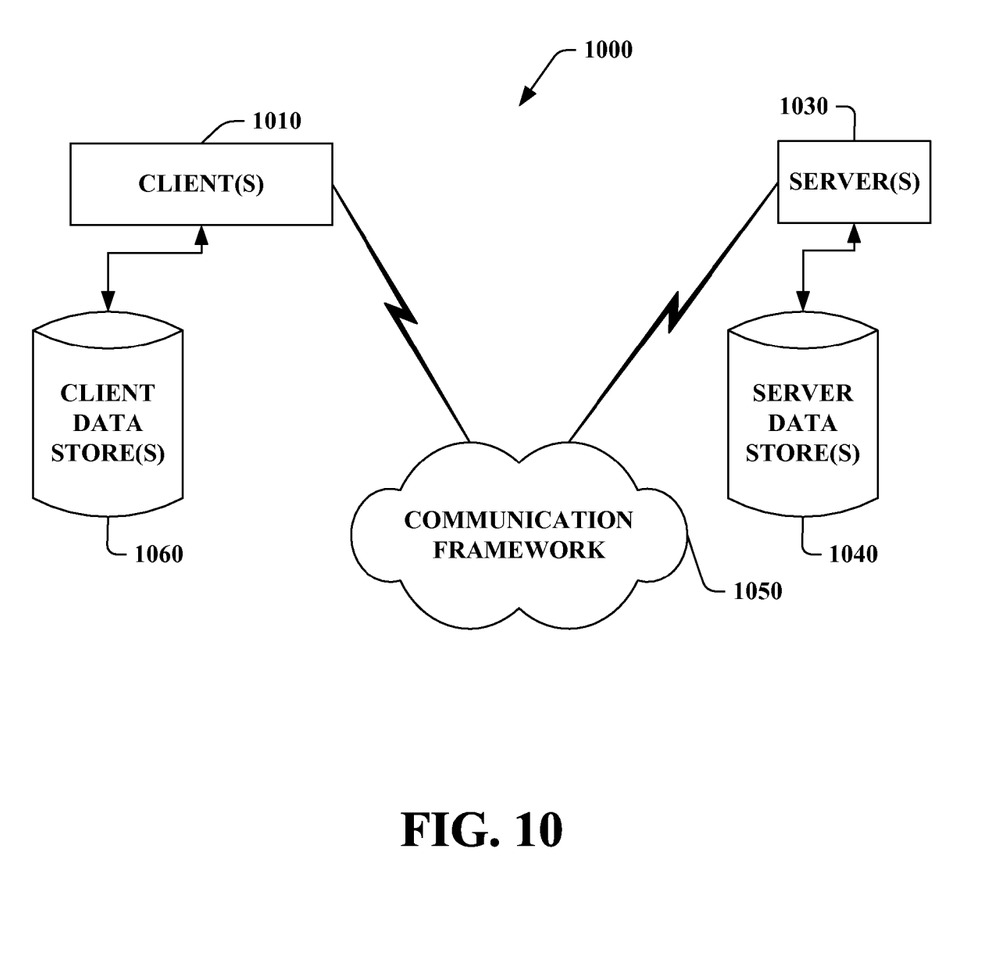
FIG. 10 depicts a schematic block diagram of a sample-computing environment with which the subject invention can interact.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A wireless device, comprising:
    a transmitter for digital wireless transmission on one of a plurality of communication channels of a communication band;
    a cognitive radio sensor for monitoring radio frequencies across the communication band;
    an interference module configured to:
        characterize an interference signal sensed by the cognitive radio sensor;
        reference a stored interference patterns data structure to compare and match the characterized interference signal with a stored interference pattern; and
        select an adaptation for the characterized interference signal from a plurality of different tailored adaptations when the characterized interference signal is recognized based on the comparison and matching, wherein at least a first tailored adaptation includes a mitigating technique that is not included in a second tailored adaptation; and
    a communication module for physical layer and medium access control (MAC) layer control that mitigates the characterized interference signal with the selected adaptation.

2. The wireless device of claim 1, wherein the stored interference patterns data structure contains patterns of different types of interference.

3. The wireless device of claim 2, wherein the different types of interference each comprise a selected modulation pattern from a group consisting of a television signal, a wireless access point, a wireless personal area networks device, a radio microphone, and a wireless terminal.

4. The wireless device of claim 2, wherein the patterns comprise a pilot signal, a lobe bandwidth size and time-sequence of signal.

5. The wireless device of claim 1, wherein characteristics of the interference signal are stored for persistent adaptation.

6. The wireless device of claim 5, further comprising a location module for determining a location pertaining to the interference signal for persistent adaptation.

7. The wireless device of claim 1, wherein the interference module characterizes the interference signal as narrowband relative to a channel bandwidth utilized by the transmitter and selects increased forward error correction as a tailored adaptation.

8. The wireless device of claim 1, wherein the interference module characterizes the interference signal as a wideband interference signal relative to channel bandwidth and as low power relative to a physical layer power setting of the transmitter.

9. The wireless device of claim 8, wherein the selected adaptation is selected from a group consisting of trading away data rate for a more robust modulation scheme, trading away data rate for a more robust forward error correction coding scheme, and increasing transmit power.

10. The wireless device of claim 1, wherein the interference module characterizes a duration of the interference signal relative to a data transmission segment, and selects a change of channel tailored adaptation in response to a determination of a long term duration interference signal.

11. The wireless device of claim 10, wherein characterizing the duration as short term or long term depends upon a threshold defined as ten times an amount of time necessary to send an average data packet.

12. The wireless device of claim 10, wherein in response to a determination of a short-term duration interference signal and a further determination of an IEEE 802.11 hidden terminal creating the interference signal, the communication module enables request to send and clear to send (RTS/CTS) protocol.

13. The wireless device of claim 10, wherein in response to a determination of a short-term duration interference signal, the interference module selects a back off tailored adaptation.

14. The wireless device of 1, wherein the interference module characterizes the interference signal of interest to ascertain power, duration and bandwidth size.

15. A method of mitigating interference, comprising:
    transmitting on a wireless digital packet communication channel of a plurality of channels of a communication band,
    monitoring power and duration of radio frequencies across the communication band;
    characterizing an interference signal;
    comparing the characterization of the interference signal to a plurality of different patterns to recognize the interference signal;
    selecting a communication adaptation for physical layer and medium access control (MAC) layer control based on the interference characterization, wherein the communication adaptation is selected from a plurality of different communication adaptations that do not have a common communication mitigating technique across the entire plurality.

16. The method of claim 15, wherein the communication adaptation is increased forward error correction adaptation selected in response to a narrowband characterization of the interference signal.

17. The method of claim 15, wherein the communication adaptation is a more robust modulation or forward error coding adaptation selected in response to a wideband, low power characterization of the interference signal.

18. The method of claim 15, wherein the communication adaptation is an avoidance adaptation in response to a long duration, high power, wideband characterization of the interference signal.

19. The method of claim 15, wherein the communication adaptation enables a request to send, clear to send (RTS/CTS) protocol adaptation selected in response to a wideband, high power, short duration characterization of the interference signal.

20. The method of claim 15, wherein the communication adaptation is a back off adaption selected in response to a wideband, high power, short duration and hidden terminal characterization of the interference signal.

21. The method of claim 15, wherein comparing the characterization further comprises the characterization including type, duration, and power.

22. A method of mitigating interference, comprising:
transmitting on a wireless digital packet communication channel of a plurality of channels of a communication band;
monitoring power and duration of radio frequencies across the communication band;
characterizing an interference signal as at least one of:
   an interference narrowband signal;
   an interference, wideband signal with a low power level relative to a physical layer power setting of a communication device;
   an interference, long term, wideband signal with a high power level relative to the physical layer power setting of the communication device; and
pattern matching the characterized interference signal with at least one adaptation, wherein:
   when the interference signal is the interference narrowband signal, the at least one adaptation increases forward error correction;
   when the interference signal is the interference, wideband signal with a low power level relative to the physical layer power setting of the communication device, the at least one adaptation is selected from i) switching to a more robust modulation scheme, or ii) increasing transmission power, or a combination thereof; and
   when the interference signal is the interference, long term, wideband signal with a high power level relative to the physical layer power setting of the communication device, the at least one adaptation is selected from i) changing channels, or ii) increasing transmission power, or a combination thereof.

* * * * *